(12) United States Patent
Smith et al.

(10) Patent No.: US 6,806,829 B2
(45) Date of Patent: Oct. 19, 2004

(54) METHOD AND APPARATUS FOR IMPROVING THE UTILITY OF A AUTOMATIC DEPENDENT SURVEILLANCE

(75) Inventors: Alexander E. Smith, McLean, VA (US); Carl Evers, Rockville, MD (US)

(73) Assignee: Rannock Corporation, Alexandria, VA (US)

( * ) Notice: Subject to any disclaimer, the term of this patent is extended or adjusted under 35 U.S.C. 154(b) by 0 days.

(21) Appl. No.: 10/638,524

(22) Filed: Aug. 12, 2003

(65) Prior Publication Data

US 2004/0032367 A1 Feb. 19, 2004

Related U.S. Application Data

(63) Continuation of application No. 09/516,215, filed on Feb. 29, 2000, now Pat. No. 6,633,259.
(60) Provisional application No. 60/123,170, filed on Mar. 5, 1999.

(51) Int. Cl.[7] .................................................. G01S 3/02
(52) U.S. Cl. ...................................... 342/456; 342/455
(58) Field of Search ................................ 342/456, 455, 342/457, 25, 36, 387; 701/120

(56) References Cited

U.S. PATENT DOCUMENTS

| | | | |
|---|---|---|---|
| 3,705,404 A | 12/1972 | Chisholm | 343/112 R |
| 4,167,006 A | 9/1979 | Funatsu et al. | 343/6.5 LC |
| 4,196,474 A | 4/1980 | Buchanan et al. | 364/461 |
| 4,229,737 A | 10/1980 | Heldwein et al. | 343/6 R |
| 4,295,446 A | 10/1981 | Voss | |
| 4,391,223 A | 7/1983 | Holland et al. | |
| 4,454,510 A | 6/1984 | Crow | 343/5 |
| 4,524,931 A | 6/1985 | Nilsson | 246/167 |
| 4,688,046 A | 8/1987 | Schwab | 342/456 |
| 4,782,450 A | 11/1988 | Flax | 364/461 |

(List continued on next page.)

FOREIGN PATENT DOCUMENTS

| | | |
|---|---|---|
| JP | 9-288175 A | 11/1994 |
| JP | 6-342061 A | 12/1994 |
| JP | 8-146130 A | 5/1996 |
| JP | 9-119983 A | 11/1996 |

OTHER PUBLICATIONS

Traffic Alert System Technical Design Summary, Final Report, Apr. 1994 (Baldwin et al.).
Airscene, The complete Air Traffic Picture in Real time, www.airscene.com, Rannoch Corporation, Alexandria, Virginia, undated.
GPS Relative Accuracy for Collision Avoidance, Institute of Navigation Technical Meeting, Jan. 1997 (Rudel et al.).
Cassell, R., Smith A., Cohen, B., Yang, E., Sleep, B., A Prototype Aircraft Performance Risk Assessment Model, Final Report, Rannoch Corporation, Feb. 28, 2002.

(List continued on next page.)

*Primary Examiner*—Dao Phan
(74) *Attorney, Agent, or Firm*—Robert P. Bell

(57) ABSTRACT

The surveillance system provides a means to augment Automatic Dependent Surveillance—Broadcast (ADS-B) with "look alike ADS-B" or "pseudo ADS-B" surveillance transmissions for aircraft which may not be ADS-B equipped. The system uses ground based surveillance to determine the position of aircraft not equipped with ADS-B, then broadcasts the identification/positional information over the ADS-B data link. ADS-B equipped aircraft broadcast their own position over the ADS-B data link. The system enables aircraft equipped with ADS-B and Cockpit Display of Traffic Information (CDTI) to obtain surveillance information on all aircraft whether or not the proximate aircraft are equipped with ADS-B.

11 Claims, 4 Drawing Sheets

U.S. PATENT DOCUMENTS

| | | | |
|---|---|---|---|
| 4,903,637 A | 2/1990 | Devault | |
| 4,914,733 A | 4/1990 | Gralnick | 340/961 |
| 5,144,315 A | 9/1992 | Schwab et al. | 342/49 |
| 5,153,836 A | 10/1992 | Fraughton et al. | 364/461 |
| 5,191,342 A | 3/1993 | Alsup et al. | 342/465 |
| 5,262,784 A | 11/1993 | Drobnicki et al. | 342/45 |
| 5,299,765 A | 4/1994 | Blechen | 244/182 |
| 5,365,516 A | 11/1994 | Jandrell | 370/18 |
| 5,374,932 A | 12/1994 | Wyschogrod et al. | 342/36 |
| 5,383,422 A | 1/1995 | Morris | |
| 5,402,116 A | 3/1995 | Ashley | 340/870.1 |
| 5,454,720 A | 10/1995 | FitzGerald et al. | 434/27 |
| 5,465,686 A | 11/1995 | Monetti et al. | |
| 5,515,811 A | 5/1996 | McAlister | |
| 5,528,244 A | 6/1996 | Schwab | 342/37 |
| 5,570,095 A | 10/1996 | Drouilhet, Jr. et al. | 342/357 |
| 5,596,326 A | 1/1997 | Fitts | 342/30 |
| 5,596,332 A | 1/1997 | Coles et al. | 342/455 |
| 5,627,546 A | 5/1997 | Crow | 342/352 |
| 5,629,691 A | 5/1997 | Jain | 340/961 |
| 5,657,949 A | 8/1997 | Deck et al. | 244/76 A |
| 5,680,140 A | 10/1997 | Loomis | 342/357 |
| 5,714,948 A | 2/1998 | Farmakis et al. | 340/961 |
| 5,774,829 A | 6/1998 | Cisneros et al. | 701/213 |
| 5,781,150 A | 7/1998 | Norris | 342/357 |
| 5,867,804 A | 2/1999 | Pilley et al. | 701/120 |
| 5,950,568 A | 9/1999 | Axelrod et al. | |
| 5,979,366 A | 11/1999 | Cook | |
| 5,999,116 A | 12/1999 | Evers | 342/36 |
| 6,049,304 A | 4/2000 | Rudel et al. | 342/357.08 |
| 6,085,150 A | 7/2000 | Henry et al. | 701/301 |
| 6,094,169 A | 7/2000 | Smith et al. | 342/465 |
| 6,133,867 A | 10/2000 | Eberwine et al. | 342/29 |
| 6,211,811 B1 | 4/2001 | Evers | 342/36 |
| 6,219,592 B1 | 4/2001 | Muller et al. | 701/9 |
| 6,292,721 B1 | 9/2001 | Conner et al. | 701/9 |
| 6,314,363 B1 | 11/2001 | Pilley et al. | 701/120 |
| 6,347,263 B1 | 2/2002 | Johnson et al. | 701/14 |
| 6,380,870 B1 | 4/2002 | Conner et al. | 340/970 |
| 6,384,783 B1 | 5/2002 | Smith et al. | 342/387 |
| 6,445,310 B1 | 9/2002 | Bateman et al. | 340/970 |
| 6,448,929 B1 | 9/2002 | Smith et al. | 342/456 |
| 6,469,664 B1 | 10/2002 | Michaelson et al. | 342/357.13 |
| 6,477,449 B1 | 11/2002 | Conner et al. | 701/4 |
| 6,571,155 B2 | 5/2003 | Carriker et al. | 701/3 |
| 6,606,034 B1 | 9/2003 | Muller et al. | 340/970 |
| 6,631,590 B1 | 10/2003 | Glowaski | |
| 6,633,259 B1 * | 10/2003 | Smith et al. | 342/456 |
| 6,691,004 B2 | 2/2004 | Johnson et al. | 701/14 |
| 2002/0009267 A1 | 1/2002 | Dunsky et al. | 701/4 |
| 2002/0021247 A1 * | 2/2002 | Smith et al. | 342/450 |

OTHER PUBLICATIONS

Cassell, R., Smith A., Cohen, B., Yang, E., Sleep, B., Esche, J., Aircraft Performance Risk Assessment Model (APRAM), Rannoch Corporation, Nov. 30, 2002.

Cox, E., A., Fuzzy Logic For Business and Industry, Charles River Media, 1995, Chapter 5.

Smith, A., Cassell, R., Cohen, B., An approach to Aircraft Performance Risk Assessment Modeling, Final Report, Rannoch Corporation, Mar. 1999.

M.L. Wood and R. W. Bush, "Multilateration on Mode S and ATCRBS Signals at Atlanta's Hartsfield Airport", Lincoln Laboratory, M.I.T., Jan. 8, 1998.

AERMOD: Description of Model Formulation (Version 02222) EPA 454/R–02–002d, Oct. 21, 2002.

FAA Integrated Noise Model, www.faa.gov, current release INM 6.1 (Mar. 4, 2002).

"Flight Explorer News: Flight Explorer and Lochard Team to Provide Enhanced Flight Tracking for Cutomers Worldwide", Apr. 28, 2003, http://www.flightexplorer/com/News/press%20release/pr042803.asp.

Source Code received by Rannoch Corp. from FAA, circa 1998.

"A Routine that converts an American Mode S address into its corresponding 'N' number string", Ken Banis, Feb. 17, 1992/.

"Description of the U.S. Algorithm for Assigning Mode A Addresses", Robeert D. Grappel, M.I.T. Lincoln Laboratory, Nov. 1991.

"Program to convert Mode S address to U.S. Tail Number", R.D. Grappel, M.I.T. Lincoln Laboratory, 1991.

"Program to convert U.S. aircraft tail numbers to Mode S code", R.D. Grappel, M.I.T. Lincoln Laboratory, 1991.

"ADSE and Multilateration Mode–S Date Fusion for Location and Identification on Airport Surface", J.G. Herraro J.A. Portas, F.J. Rodriguez, (*IEEE 1999 Rader Conference Proceedings*, pp. 315–320, Apr. 20–22, 1999).

D.C. Rickard, D.J.Sherry, S.J.Taylor, "The development of a prototype aircraft–height monitoring unit utilising an SSR–based difference in time of arrival technique", Intenational Conference Radar 92 (Conf. Publ. No. 365), 1992, p 250–3.

E. E. Manotakis and C. C. Lefas, "Aircraft geometric height computation using secondary surveillance radar range differences," IEE Proceedings–F, Radar, Sonar, Navigation, vol. 141, No. 2, pp. 139–148, 1994.

Request for Proposal: Noise and Operations Monitoring System, Indianapolis Airport Authority, Indianapolis, Indiana, Sep. 29, 2003.

Attcahment A: Technical Specifications for a Aircraft Flight Track and Noise Management System for the Regional Airport Authority of Louisville and Jefferson County, Harris Miller Miller & Hanson, Inc., May 19, 2003.

Application of CNS/ATM Technologies to Airport Management, Alex Smith and Jon Baldwin, Rannoch Corporation, Alexandria, Virginia.

Overview of the FAA ADS–8 Link Decision, John Scardina, Federal Aviation Administration, Jun. 7, 2002.

Automated Correlation of Aircraft Flight Tracks and Events with ATC Data, Alex Smith, Rannoch Corporation, Alexandria, Virginia.

Protest Letter dated May 16, 2002 from Otto M. Wildensteiner, U.S. Department of Transportation, Washington, DC.

"Comparison of Claims in Application Ser. No. 09/971,672 with Prior Art", May 16, 2002, Otto M. Wildensteiner, Department of Transportation, Washington, DC.

"Minimum Aviation System Performance Standards for Automatic Dependent Surveillance Broadcast (ADS–B)", RCTA, Inc. Washington, DC, ©1998.

"Runway Incursion Reduction Program Dallas–Ft. Worth Formal Evaluation Report, Final Report", Trios Associates, Inc. Dec. 21, 2000.

"TIS–B DFW Application for Airport Surface Situational Awareness", Trios Associates, Inc., Sep. 6, 2000.

"A Prototype Transceiver for Evaluating An Integrated Broadcast Data Link Architecture" Chris Moody & Warrent Wilson, RCTA SC–186, Aug. 17, 1995, RTCA Paper No. 449–95/SC186–033.

"The Universal Access Tranceiver (UAT)", Warren Wilson & Chris Moody, May 10, 1995.

"Terminal Area Productivity (TAP) Study Low Visibility Landing and Surface Operations (LVLASO) Demonstration Report" Surface Surveillance Products Team (AND–410) Sep. 4, 1998.

"Phase I—Operational Evaluation Final Report Cargo Airline Association ADS–B Program, FAA SafeFlight 21 Program" Apr. 10, 2000.

"Capstone Program Plan Version 1.0", Federal Aviation Administration, Mar. 10, 1999.

"TIS–B Concept and Approach", MITRE, Chris Moody, Feb. 29, 2000.

"RTCA Special Committee 186, Working Group 5 ADS–B UAT MOPS Meeting #2, Proposed Contents and Transmission Rates for ADS–B Messages" Chris Moody, MITRE Corp., Feb. 20, 2001.

"Airborne Information Initiative: Capitalizing on a Multi-Purpose Broadcast Communications Architecture", R.C. Strain, J.C. Moody, E.C. Hahn, B.E. Dunbar, S. Kavoussi, J.P. Mittelman, Digital Avoinics Systems Conference, Oct. 1995.

"Minutes of SC–186 WG–2 (TIS–B) Meeting", Jun. 13–14, 2000.

Department of Transportation Federal Aviation Administration System Specification, Ground–Based Transceiver (GBT) for Broadcast Services Using the Universal Access Transceiver (UAT) Data Link, FAA–E–2973, Jan. 15, 2004.

* cited by examiner

METHOD AND APPARATUS FOR IMPROVING THE UTILITY OF A AUTOMATIC DEPENDENT SURVEILLANCE

CROSS-REFERENCE TO RELATED APPLICATIONS

The present application is a continuation of U.S. patent application Ser. No. 09/516,215, filed on Feb. 29, 2000, now U.S. patent No. 6,633,259, which in turn claims priority from Provisional Application Ser. No. 60/123,170, filed Mar. 5, 1999, both of which are incorporated herein by reference in their entirety.

The subject matter of the present application is related to the following issued U.S. Patents, assigned to the same assignee as the present invention, all of which are incorporated herein by reference in their entirety:

U.S. Pat. No. 6,049,304, issued Apr. 11, 2000, entitled "Method and Apparatus for Improving the Accuracy of Relative Position Estimates In a Satellite-Based Navigation System";

U.S. Pat. No. 5,999,116, issued Dec. 7, 1999, entitled "Method and Apparatus for Improving the Surveillance Coverage and Target Identification in a Radar Based Surveillance System";

U.S. Pat. No. 6,094,169, issued Jul. 25, 2000, entitled "Passive Multilateration Auto-Calibration and Position Error Correction";

U.S. Pat. No. 6,384,783, issued on May 7, 2002, entitled "Method and Apparatus for Correlating Flight Identification Data With Secondary Surveillance Radar Data";

U.S. Pat. No. 6,211,811, issued Apr. 2, 2001, entitled "Method and Apparatus for Improving the Surveillance Coverage and Target Identification in a Radar Based Surveillance System";

U.S. Pat. No. 6,448,929, issued Sep. 10, 2002, entitled "Method and Apparatus for Correlating Flight Identification Data With Secondary Surveillance Radar Data"; and U.S. Pat. No. 6,567,043, issued May 20, 2003, entitled "METHOD AND APPARATUS FOR IMPROVING THE UTILITY OF AUTOMATIC DEPENDENT SURVEILLANCE".

In addition, the subject matter of the present application is related to that in the following U.S. Patent Applications:

U.S. patent application Ser. No. 10/319,725, filed Dec. 16, 2002, entitled "VOICE RECOGNITION LANDING FEE BILLING SYSTEM", incorporated herein by reference in its entirety; and Provisional U.S. Patent Application No. 60/440,618, filed Jan. 17, 2003, incorporated herein by reference in its entirety.

FIELD OF THE INVENTION

The present invention relates to the field of aircraft surveillance and monitoring, particularly toward a technique known as Automatic Dependent Surveillance.

BACKGROUND OF THE INVENTION

The Automatic Dependent Surveillance—Broadcast (ADS-B) concept has been introduced as a means to enhance future ground and avionics based surveillance of aircraft. This concept is defined in *Minimum Aviation System Performance Standards for Automatic Dependent Surveillance Broadcast* (ADS-B), RTCA/DO-186, February 1998, which is later referred to as ADS-B MASPS and is incorporated herein by reference. The ADS-B concept provides for aircraft and ground vehicles to periodically broadcast their state vector (horizontal and vertical position, horizontal and vertical velocity) and other information.

A specific implementation of a 1090 MHz based ADS-B system is described in Drouilhet et al., U.S. Pat. No. 5,570,095, issued Oct. 29, 1996 and incorporated herein by reference. The broadcast ADS-B message provides surveillance information to other users, principally Air Traffic Control (ATC) and aircraft/vehicle operators.

Applications for ADS-B include ATC display of traffic, runway incursion detection and alerting, and Cockpit Display of Traffic Information (CDTI). One example of CDTI is a map-like display centered on a pilot's aircraft showing relative positions and intentions of other proximate aircraft. Another example of CDTI is provided in Buchanan et al., U.S. Pat. No. 4,196,474, issued Apr. 1, 1980, also incorporated herein by reference.

The Federal Aviation Administration (FAA) and the National Aeronautics and Space Administration (NASA) have investigated the suitability of this technology to support these applications in the airport surface environment. NASA recently tested ADS-B using 1090 MHz data transmission in an airport surface environment as part of the Low Visibility Landing and Surface Operations (LVLASO) program. Tests have been performed to assess how well 1090 MHz ADS-B performs with respect to surveillance system requirements established by the International Civil Aviation Organization (ICAO) and RTCA.

Two issues were identified during ADS-B system implementation and testing at Atlanta Hartsfield International Airport (ATL) as described in "*Application of ADS-B for Airport Surface Surveillance*", Dan Hicok, Derrick Lee, 17th Digital Avionics System Conference, November, 1998:

1. A method may be required for CDTI equipped aircraft to obtain surveillance information on aircraft and ground vehicles which are not equipped with ADS-B.
2. Loss of ADS-B surveillance may occur due to multipath, blockage, and antenna pattern nulls.

Aircraft equipped with ADS-B and CDTI receive surveillance information directly from ADS-B transmissions. ADS-B implementation may require installation of new avionics equipment. There may inevitably be a transition period when some aircraft are ADS-B equipped and other aircraft are not. ADS-B MASPS has defined a means to augment ADS-B with a Traffic Information Services (TIS) data link, whereby ground based surveillance information for all aircraft is transmitted to CDTI capable aircraft.

An example of a TIS implementation may be found in Crow, U.S. Pat. No. 5,627,546, issued May 6, 1997, and incorporated herein by reference. Two sources of TIS traffic information are secondary surveillance radar and multilateration, as described in Schwab, U.S. Pat. No. 5,528,244, issued Jun. 18, 1996, and Alsup et al., U.S. Pat. No. 5,191,342, issued Mar. 3, 1993, both of which are incorporated herein by reference. A TIS data link was implemented at ATL for testing. A major limitation of TIS is the implementation may require aircraft owners to purchase a second data link in addition to the ADS-B link.

ATL testing also showed obstructions and multipath from structures may result in degradation or total loss of direct aircraft-to-aircraft ADS-B surveillance. The airport surface environment may be particularly challenging due to the presence of large structures, such as concourses and hangars.

Loss of surveillance and degraded surveillance negatively impacts the ability of a pilot to maintain situational awareness of arrivals, departures and runway occupancy.

Accordingly, what is needed is a new method to augment the ADS-B concept using the ADS-B data link to provide surveillance information for aircraft and ground vehicles which are not equipped with ADS-B. This new method needs to provide a means to reinforce ADS-B transmissions which are adversely impacted by the environment.

SUMMARY OF THE INVENTION

The present invention provides an improved apparatus and method for use with Automatic Dependent Surveillance-Broadcast (ADS-B). In a method and apparatus of the present invention, each ADS-B equipped aircraft may periodically broadcast its position as derived from its navigation system.

Aircraft with ADS-B receivers may then be able to receive these broadcasts to obtain the location of proximate ADS-B equipped aircraft. The invention provides a means to augment ADS-B transmissions with position and identification information of aircraft which may not be ADS-B equipped.

In addition, the present invention reinforces ADS-B transmissions in areas where line-of-sight or multipath issues prevent reliable ADS-B communications between two aircraft.

DETAILED DESCRIPTION OF THE INVENTION

The present invention is now described with reference to the accompanying Figures where like reference numbers denote like element or steps.

Figure 1:
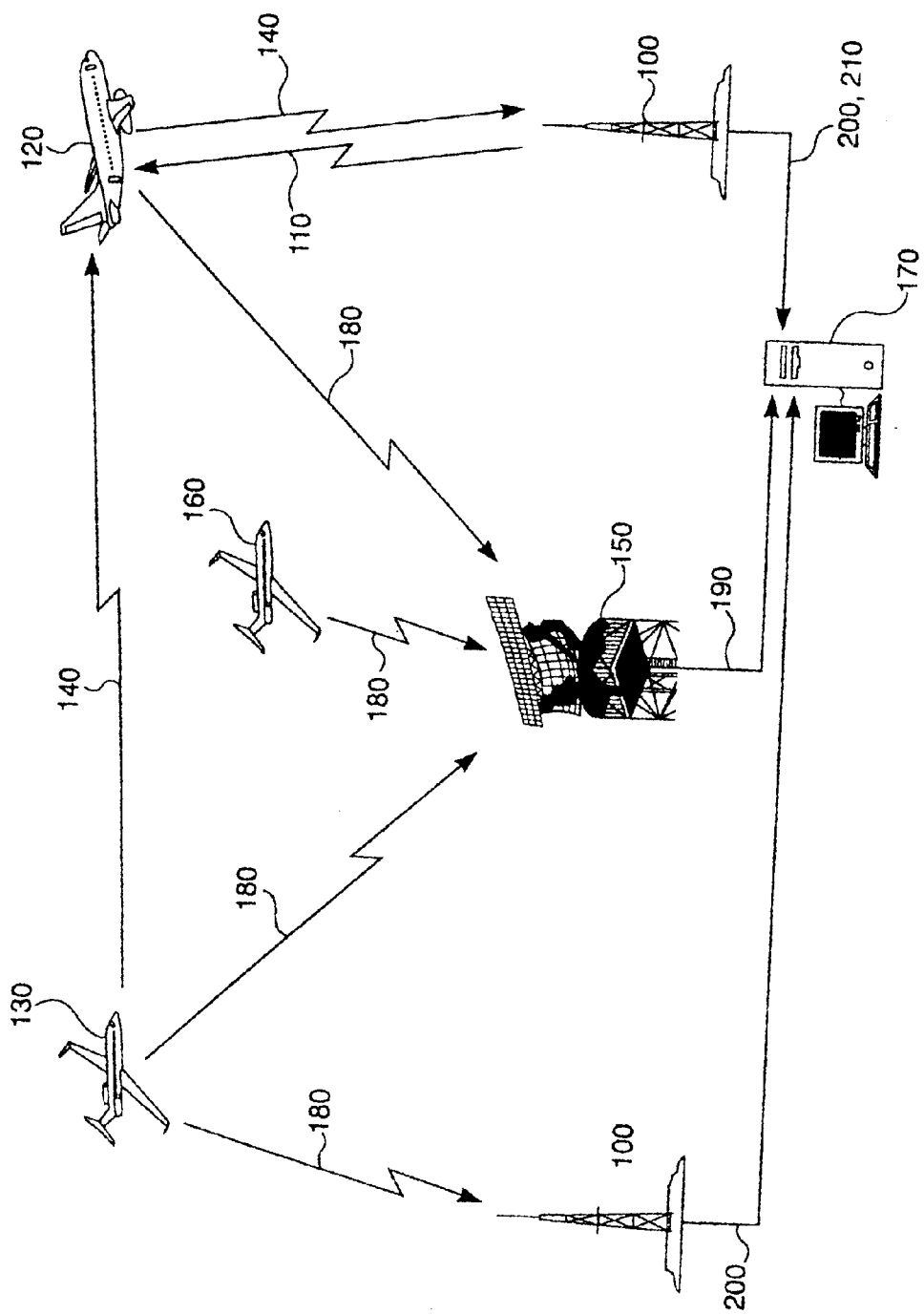
FIG. 1 is a diagram depicting "pseudo" ADS-B augmentation ADS-B concept using SSR Surveillance.

In the preferred embodiment, a "pseudo" ADS-B ground system comprising one or more 1090 MHz remote receiver/transmitters 100 and a central workstation 170 may be used to provide a source for 1090 MHz "pseudo" ADS-B transmissions 110, as illustrated in FIG. 1. 1090 MHz "pseudo" ADS-B transmissions 110 serve to augment 1090 MHz ADS-B transmission 140 thus providing ADS-B/CDTI equipped aircraft 120 with a complete picture of all proximate aircraft 130, 160.

As defined by the ADS-B concept [RTCA ADS-B MASPS], aircraft equipped with ADS-B 130, 120 periodically broadcast their own position information via ADS-B transmission. In the preferred embodiment these ADS-B transmissions may be performed using an aircraft transponder frequency of 1090 MHz. ADS-B/CDTI equipped aircraft 120 receive and decode these 1090 MHz ADS-B transmissions 140 to obtain position information on proximate ADS-B equipped aircraft 130.

The 1090 MHz "pseudo" ADS-B ground system provides ADS-B/CDTI equipped aircraft 120 with periodic 1090 MHz ADS-B like broadcast transmissions or 1090 MHz "pseudo" ADS-B transmissions 110 representing position data for aircraft not equipped with ADS-B 160. While FIG. 1 illustrates only one 1090 MHz remote receiver/transmitter 100 performing 1090 MHz "pseudo" ADS-B transmissions 110, any or all 1090 MHz remote receiver/transmitters 100 may broadcast 1090 MHz "pseudo" ADS-B transmissions 110.

1090 MHz remote receiver/transmitters 100 receives and decodes 1090 MHz ADS transmissions 140 to identify and locate ADS-B equipped aircraft 120, 130. 1090 MHz remote receiver/transmitters 100 send ADS-B surveillance data 200 to central workstation 170. Central workstation 170 receives target information 190 from Secondary Surveillance Radar (SSR) 150 and/or a 1090 MHz multilateration system to obtain surveillance information for all transponder equipped aircraft 120, 130, including non-ADS-B aircraft 160.

All aircraft which are ADS-B equipped may have a transponder. Non ADS-B aircraft may also be provided with a transponder. The transponder generates a radio signal identifying the aircraft (and optionally providing altitude or other data) either periodically, in response to a radar signal, or when "squawked" by the pilot or other operator of the aircraft.

Central workstation 170 correlates 1090 MHz ADS-B aircraft targets to transponder equipped targets. Central workstation 170 identifies transponder equipped targets which do not have a corresponding ADS-B position, thus may not be ADS-B equipped (e.g., aircraft 160 in FIG. 1). Transponder identification and position information for non-ADS-B equipped aircraft 210 may be sent to 1090 MHz remote receiver/transmitters 100 where it may be broadcasted via 1090 MHz "pseudo" ADS-B transmissions 110.

Figure 3:
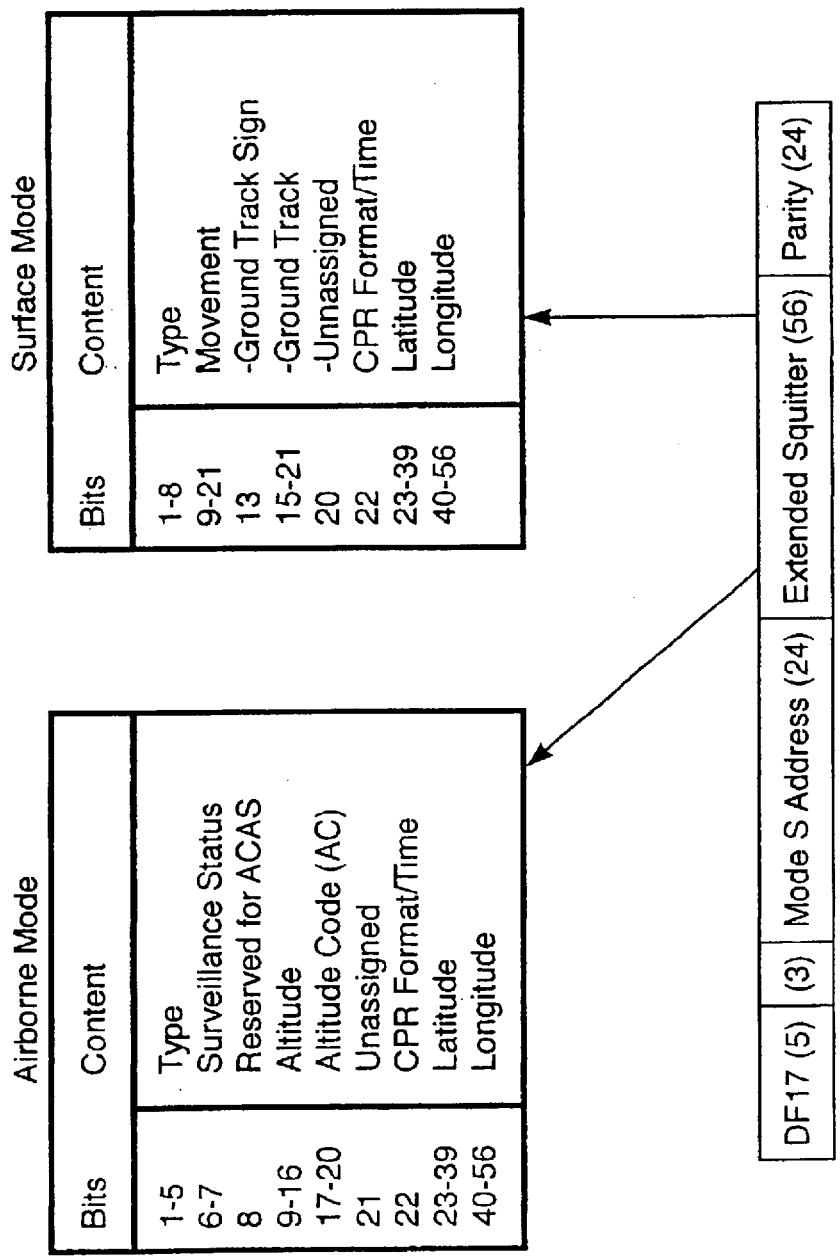
FIG. 3 is a diagram depicting a 1090 MHz ADS-B format.

One version of 1090 MHz ADS-B position report 140 format may be defined in FIG. 3. Aircraft may be equipped with either a Mode S or an ATCRBS transponder as defined in *Minimum Operational Performance Standards for Air Traffic Control Radar Beacon System/Mode Select (ATCRBS/MODE S) Airborne Equipment, RTCA/DO-181A, January 1992*. The ADS-B message address may be identical to the Mode S transponder address. Accordingly, the ADS-B address may be obtained directly from the Mode S address.

Some aircraft may be equipped with ATCRBS transponders, instead of Mode S. The ATCRBS message contains a Mode A address, which may be used to generate a ADS-B address. One method to convert Mode A address to ADS-B message address may be to apply an algorithm which converts an aircraft tail number (e.g., registration number or N-number) to a 24 bit address. Mode A address may be converted from the tail number obtained by accessing flight plan information. In turn, the tail number may be converted to a ADS-B address. This algorithm is presently used by the Federal Aviation Administration to assign newly installed Mode S transponders with an address.

1090 MHz remote receiver/transmitters 100 may generate "pseudo" ADS-B transmissions 110 for ground vehicles operating on an airport movement area. Ground vehicle surface surveillance may be obtained from a primary radar or other surveillance means. The "pseudo" ADS-B transmissions mimic the format and style of "real" ADS-B transmissions, and thus are indistinguishable to ADS-B equipment provided in an aircraft. The "pseudo" ADS-B transmission is created from secondary aircraft location data (e.g., radar, multilateration, or the like) for non-ADS-B equipped aircraft. An airplane receiving "pseudo" ADS-B data processes such data in the same manner as "real" ADS-B data, and thus can locate, using ADS-B equipment, non-ADS-B equipped aircraft (e.g., aircraft 160).

As may be readily appreciated by one of ordinary skill in the art, the use of such "pseudo" ADS-B transmissions allows the ADS-B system to be used even in situations where not all aircraft are ADS-B equipped. Of course, non-ADS-B aircraft will still not be detected in areas where "pseudo" ADS-B transmission equipment is not located. However, the risk of collision and situations of heavy traffic usually occur in major metropolitan and airport areas which can be readily served by such a "pseudo" ADS-B system.

Figure 2:
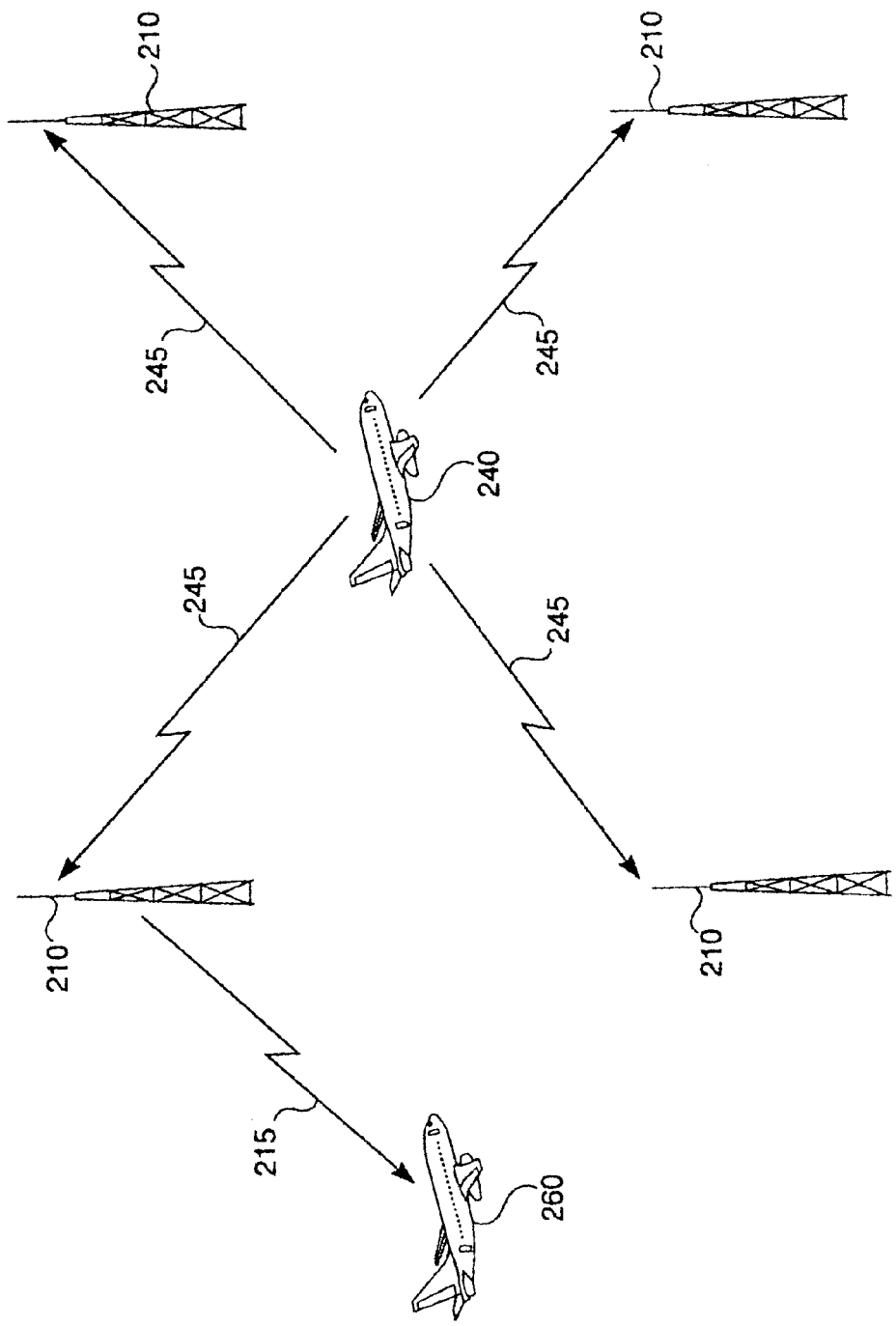
FIG. 2 is a diagram depicting "pseudo" ADS-B augmentation ADS-B concept using Multilateration Surveillance.

An ADS-B augmentation using 1090 MHz multilateration as a surveillance source is illustrated in FIG. 2. Multilateration systems receive aircraft transponder transmissions 245 and apply Time Difference of Arrival techniques to determine an aircraft position. A basic requirement of a multilateration system may be to provide a Time of Arrival (TOA) measurement capability. An example of such a multilateration system is discussed in co-pending U.S. patent application Ser. No. 09/209,008, entitled "Passive Multilateration Auto-Calibration and Position Error Correction", incorporated herein by reference.

A plurality of 1090 MHz remote receiver/transmitters 210 with TOA measurement hardware provide a means to perform multilateration to determine a position of aircraft not equipped with ADS-B 240. 1090 MHz remote receiver/transmitters 210 provide traffic information to ADS-B/CDTI equipped aircraft 260 via "pseudo" ADS-B transmissions 250.

Figure 4:
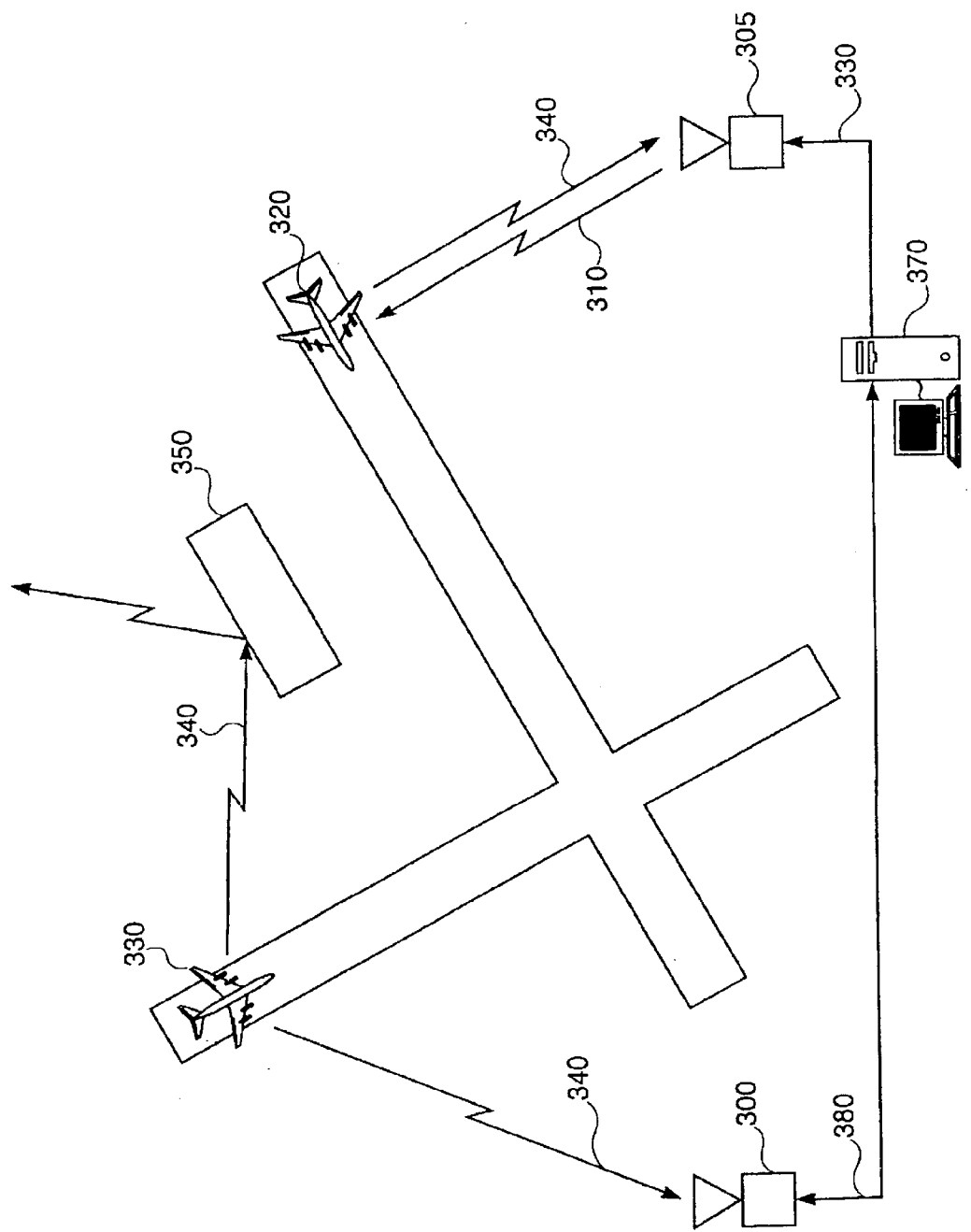
FIG. 4 is a diagram depicting "pseudo" ADS-B reinforcement of ADS-B transmissions.

The "pseudo" ADS-B ground system provides a means to reinforce 1090 MHz ADS-B transmissions 340 with 1090 MHz "pseudo" ADS-B transmissions 310, as illustrated in FIG. 4. A system comprising a central workstation 370 and a plurality of 1090 MHz receiver/transmitters 300 and 305 provides diversity for both receiving ADS-B messages 340 and transmitting "pseudo" ADS-B messages 310. FIG. 4 illustrates a case where line-of-sight may be obstructed by a building 350 between two ADS-B/CDTI equipped aircraft 330 and 320 operating on intersecting runways.

One aircraft may be designated as the source aircraft 330 and the other aircraft may be designated as the destination aircraft 320. When source aircraft 330 transmits a 1090 MHz ADS-B transmission 340, it may be received by a 1090 MHz remote receiver/transmitter 300. Decoded ADS-B transmission 380 may be sent to a central workstation 370. Central workstation 370 determines when another 1090 MHz ADS-B/CDTI equipped aircraft 320 may require traffic information reinforcement with decoded ADS-B transmission 380.

Central workstation 370 routes message 330 to a remote receiver/transmitter 305, which has line-of-sight with destination aircraft 320. 1090 MHz remote receiver/transmitter 305 transmits a reinforcing 1090 MHz "pseudo" ADS-B transmission 310. 1090 MHz "pseudo" ADS-B transmission 310 may be identical in content to 1090 MHz ADS-B transmission 340 originating from source aircraft 330.

The system selects 1090 MHz remote receiver/transmitter 300, 305, which has line-of-sight and the highest probability of being received at the destination aircraft. A test or multipath simulation may be performed when the system may be first installed to determine, which remote receiver/transmitter has the highest probability of transmission reception success for each location of the movement area or airspace.

The main implementation of ADS-B may be through Mode S or 1090 MHz datalink technology. Mode S message formats have been allocated for ADS-B use. Note that, also, some implementations of ADS-B may use other datalinks (such as digital VHF, or TDMA-like formats). However, the same technology may be applied in the present invention regardless of the datalink selected for use.

While the preferred embodiment and various alternative embodiments of the invention have been disclosed and described in detail herein, it may be apparent to those skilled in the art that various changes in form and detail may be made therein without departing from the spirit and scope thereof.

We claim:

1. An aircraft position location system for generating position data for a plurality of aircraft, the system comprising:

means for receiving aircraft position data from a broadcast aircraft position system;

means for generating aircraft position data using data other than broadcast aircraft position system data;

means for correlating aircraft position data from the broadcast aircraft position system with aircraft position data from other than the broadcast aircraft position system;

means for generating broadcast aircraft position system data for aircraft not equipped with the broadcast aircraft position system from aircraft position data generated using data other than the broadcast aircraft position system data; and means for transmitting the broadcast aircraft position system data to aircraft equipped with the broadcast aircraft position system such that aircraft equipped with the broadcast aircraft position system can determine locations of aircraft not equipped with the broadcast aircraft location position system.

2. The aircraft position location system of claim 1, wherein said means for receiving aircraft position data from a broadcast aircraft position system comprises means for receiving data from a plurality of Automatic Dependent Surveillance System—Broadcast (ADS-B) units on a plurality of corresponding aircraft, each ADS-B unit generating and transmitting position data.

3. The aircraft position location system of claim 1, wherein said means for receiving aircraft position data from a broadcast aircraft position system comprises means for receiving data from a ground-based Automatic Dependent Surveillance System—Broadcast (ADS-B), each ADS-B unit generating and transmitting position data.

4. The aircraft position location system of claim 3, wherein said means for generating aircraft position data using data other than broadcast aircraft position system data comprises a ground-based broadcast aircraft position system operating with a predefined format not compatible with a format of a ground-based Automatic Dependent Surveillance System—Broadcast (ADS-B).

5. The aircraft position location system of claim 2, wherein said means for generating aircraft position data using data other than broadcast aircraft position system data comprises a ground-based multilateration system.

6. The aircraft position location system of claim 4, wherein said means for correlating aircraft position data from the broadcast aircraft position system with aircraft position data from other than the broadcast aircraft position system comprises software running on a workstation for receiving ADS-B data and secondary surveillance radar data, and determining from the secondary surveillance radar data and ADS-B data, which aircraft do not have ADS-B units.

7. The aircraft position location system of claim 5, wherein said means for correlating aircraft position data from the broadcast aircraft position system with aircraft position data from other than the broadcast aircraft position system comprises software running on a workstation for receiving ADS-B data and multilateration data, and determining from the multilateration data and ADS-B data, which aircraft do not have ADS-B units.

8. The aircraft position location system of claim 6, wherein said means for generating broadcast aircraft position system data for aircraft not equipped with the broadcast aircraft position system comprises software running on the workstation for generating an ADS-B format signal indicating position of a detected aircraft not having an ADS-B unit.

9. The aircraft position location system of claim 7, wherein said means for generating broadcast aircraft position system data for aircraft not equipped with the broadcast aircraft position system comprises software running on the workstation for generating an ADS-B format signal indicating position of a detected aircraft not having an ADS-B unit.

10. The aircraft position location system of claim 8, wherein said means for transmitting the broadcast aircraft position system data for aircraft not equipped with the broadcast aircraft position system comprises a transmitter, for transmitting the ADS-B format signal indicating position of a detected aircraft not having an ADS-B unit.

11. The aircraft position location system of claim 9, wherein said means for transmitting the broadcast aircraft position system data for aircraft not equipped with the broadcast aircraft position system comprises a transmitter, for transmitting the ADS-B format signal indicating position of a detected aircraft not having an ADS-B unit.

* * * * *